(12) United States Patent
Qiu et al.

(10) Patent No.: US 10,654,412 B2
(45) Date of Patent: May 19, 2020

(54) NOTIFICATION SYSTEM AND INFORMATION PROCESSING DEVICE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/163,520

(22) Filed: Oct. 17, 2018

(65) Prior Publication Data

US 2019/0118709 A1 Apr. 25, 2019

(30) Foreign Application Priority Data

Oct. 20, 2017 (JP) .................................. 2017-203746

(51) Int. Cl.
*B60Q 9/00* (2006.01)
*G06K 7/10* (2006.01)
*G06K 19/077* (2006.01)
*B60L 50/50* (2019.01)
*B60P 3/20* (2006.01)

(52) U.S. Cl.
CPC .............. *B60Q 9/00* (2013.01); *B60L 50/50* (2019.02); *G06K 7/10366* (2013.01); *G06K 19/07758* (2013.01); *B60P 3/20* (2013.01)

(58) Field of Classification Search
CPC .............. B60Q 9/00; G06K 19/07758; G06K 7/10366; B60P 3/20; F25D 2500/06; F25D 29/00; G08B 21/24; G07G 1/009; B60L 3/12; B60L 50/50; H04W 4/80; H04W 4/021
See application file for complete search history.

(56) References Cited

U.S. PATENT DOCUMENTS 3,589,139 A * 6/1971 Arthur ................. B65D 88/745
62/115
6,313,791 B1 * 11/2001 Klanke ................. B60R 25/018
342/357.75
7,830,117 B2 * 11/2010 Ambrosio ............. B60L 3/0046
320/109

(Continued)

FOREIGN PATENT DOCUMENTS

JP 2001-147075 A 5/2001

*Primary Examiner* — Ryan W Sherwin
(74) *Attorney, Agent, or Firm* — Hunton Andrews Kurth LLP

(57) ABSTRACT

The notification system includes: an electric vehicle provided with a cooling box, a battery, and wheels driven by the electric power from the battery; an acquisition device configured to obtain storage information indicating storage conditions for a commodity selected by a user; a processor configured to send a warning signal when a travelling distance which can be covered by the electric vehicle with the selected commodity being preserved in the cooling box under the storage conditions indicated by the storage information is shorter than a predetermined distance; and a notification device configured to notify the user of a warning upon receiving the warning signal.

5 Claims, 9 Drawing Sheets

(56) References Cited

U.S. PATENT DOCUMENTS

| | | | | |
|---|---|---|---|---|
| 9,389,007 | B1* | 7/2016 | McKay | F25B 27/00 |
| 2005/0091988 | A1* | 5/2005 | Stewart | B60P 3/007 |
| | | | | 62/3.1 |
| 2005/0204763 | A1* | 9/2005 | Smith | B60H 1/00014 |
| | | | | 62/239 |
| 2010/0305794 | A1* | 12/2010 | Foster | B60L 1/003 |
| | | | | 701/22 |
| 2011/0208613 | A1* | 8/2011 | Parham | G06Q 30/06 |
| | | | | 705/26.61 |
| 2015/0032318 | A1* | 1/2015 | Gao | B60L 58/12 |
| | | | | 701/22 |
| 2015/0047947 | A1* | 2/2015 | Tait | B60S 5/06 |
| | | | | 198/339.1 |
| 2017/0323258 | A1* | 11/2017 | Semsey | G06Q 10/083 |
| 2018/0211217 | A1* | 7/2018 | Berdinis | G05D 1/0212 |
| 2018/0257666 | A1* | 9/2018 | Bryan | B60H 1/00385 |
| 2019/0094857 | A1* | 3/2019 | Jertberg | B60W 10/08 |

* cited by examiner

| COMMODITY ID | ○○○1 |
|---|---|
| COMMODITY NAME | CHICKEN MEAT |
| STORAGE TYPE | REFRIGERATED |
| STORAGE TEMPERATURE | 5°C OR LOWER |
| WEIGHT | 200g |

TABULATION BUTTON — 80

NOTE:
FOR INFORMATION ABOUT COMMODITIES IN THE SHOPPING BASKET, PLEASE PRESS THE TABULATION BUTTON.

| COMMODITY NAME | CHICKEN MEAT | LETTUCE | ICE CREAM | FROZEN DUMPLING |
|---|---|---|---|---|
| STORAGE TYPE | REFRIGERATED | REFRIGERATED | FROZEN | FROZEN |
| STORAGE TEMPERATURE | 5°C OR LOWER | 7°C OR LOWER | −10°C OR LOWER | −5°C OR LOWER |
| WEIGHT | 200g | 100g | 100g | 200g |

NOTIFICATION SYSTEM AND INFORMATION PROCESSING DEVICE

This non-provisional application is based on Japanese Patent Application No. 2017-203746 filed on Oct. 20, 2017 with the Japan Patent Office, the entire contents of which are hereby incorporated by reference.

BACKGROUND

Field

The present disclosure relates to a notification system and an information processing device.

Description of the Background Art

Japanese Patent Laying-Open No. 2001-147075 describes a refrigerating system including a refrigerator and a remote controller disposed at a position distant from the refrigerator.

In the refrigeration system described above, the refrigerator sends information such as the temperature inside the refrigerator to the remote controller. Thus, the user may know the temperature inside the refrigerator from a location distant from the refrigerator, and may change the preset temperature inside the refrigerator as well.

SUMMARY

A user who possesses an electric vehicle equipped with a cooling box may select fresh foods and frozen foods at a store such as a supermarket and put them into a shopping basket or the like.

After the user purchases the selected commodities and transports the purchased commodities with an electric vehicle, it is necessary to keep the purchased commodities refrigerated or frozen depending on the purchased commodities.

On the other hand, after purchasing the commodities, the user may go home directly or may head to the next destination. In either case, the remaining power of a battery mounted on the electric vehicle may be less than the sum of the electric power required to refrigerate or freeze the purchased commodities and the travelling power required by the electric vehicle to go home or move to the next destination.

Thus, it is impossible to reach the destination with the purchased commodities being refrigerated or frozen at the same time.

The present disclosure has been accomplished in view of the aforementioned problems, and an object thereof is to provide a notification system and an information processing device capable of preventing a travelling distance which can be covered by the electric vehicle from becoming shorter than a predetermined distance when the electric vehicle is travelling with a commodity selected by the user being preserved under refrigerated or frozen conditions.

The notification system according to the present disclosure includes: an electric vehicle provided with a cooling box, a battery, and wheels driven by electric power from the battery; an acquisition device configured to obtain storage information indicating storage conditions for a commodity selected by a user; a processor configured to send a warning signal when a travelling distance which can be covered by the electric vehicle with the selected commodity being preserved in the cooling box under the storage conditions indicated by the storage information is shorter than a predetermined distance, and a notification device configured to notify the user of a warning upon receiving the warning signal.

According to the notification system described above, it is possible to preventing the traveling distance which can be covered by the electric vehicle from becoming shorter than the predetermined distance when the electric vehicle is travelling with a commodity selected by the user being preserved under refrigerated or frozen conditions.

The notification system may further include an RF tag attached to a commodity, and an RF tag reader provided with the acquisition device and configured to communicate with the RF tag, wherein the RF tag includes a tag memory device configured to store the storage information of a commodity to which the RF tag is attached, and the RF tag reader obtains the storage information of the selected commodity from the RF tag.

According to the above notification system, by using the RF tag, it is possible to obtain the storage information of a plurality of commodities in a short time.

The notification system may further include a mobile terminal provided with the notification device and carried by the user, wherein the processor is mounted on the electric vehicle, the mobile terminal is configured to communicate with the RF tag reader and the electric vehicle, the RF tag reader sends the storage information of the selected commodity to the mobile terminal, and the mobile terminal sends the storage information of the selected commodity received from the RF tag reader to the electric vehicle.

According to the notification system described above, a warning may be issued to the user from the mobile terminal of the user so as to easily notify the user.

The notification system further includes an input device for inputting a destination, and a position information acquisition device configured to obtain a current position of the electric vehicle, wherein the predetermined distance is a distance between the destination input into the input device and the current position obtained by the position information acquisition device.

According to the notification system described above, the user may know whether it is possible to reach the destination with the selected commodity being preserved under the storage conditions.

An information processing device according to the present disclosure includes an acquisition device configured to obtain storage information of a commodity selected by a user, and a processor configured to send a warning signal when a travelling distance which can be covered by an electric vehicle with the selected commodity being preserved in a cooling box, which is mounted on the electric vehicle, under storage conditions indicated by the storage information is shorter than a predetermined distance.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
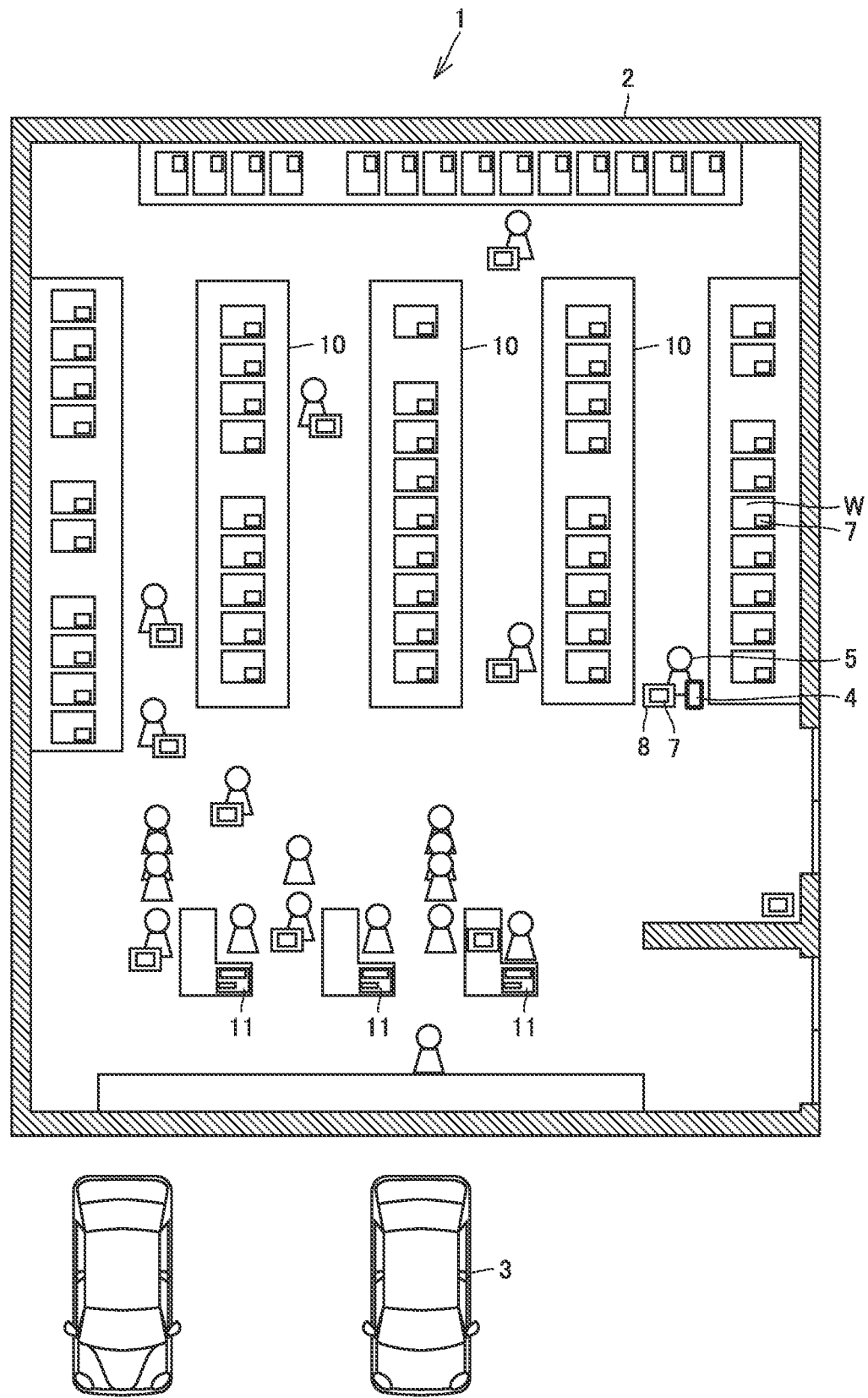
FIG. 1 is a block diagram schematically illustrating a notification system 1.

A notification system 1 according to the present embodiment will be described with reference to FIGS. 1 to 13. In the configurations illustrated in FIGS. 1 to 13, the same or substantially the same components are designated by the same reference numerals, and the description thereof will not be repeated.

FIG. 1 is a block diagram schematically illustrating the notification system 1. The notification system 1 includes a plurality of commodities W displayed in a store 2, an electric vehicle 3 and a smart phone 4 which are possessed by a user 5, an RF tag 6, and an RF tag reader 7 provided in a shopping basket 8.

The store 2 includes a plurality of display shelves 10 and a plurality of accounting devices 11. The plurality of commodities W are displayed on each display shelf 10.

There are plural types of commodities W including, for example, refrigerated foods, frozen foods, foods that can be preserved at room temperature, and commodities other than foods.

Figure 2:
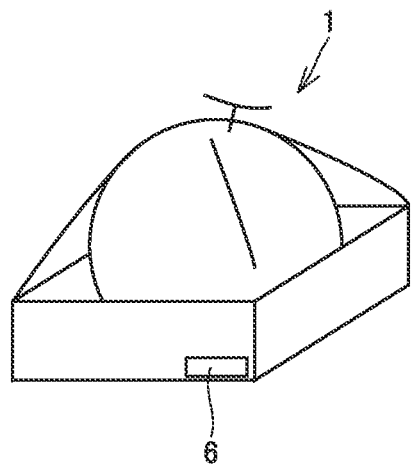
FIG. 2 is a schematic diagram schematically illustrating a commodity W.

FIG. 2 is a schematic diagram schematically illustrating a commodity W. Generally, the commodity W is wrapped by a package or the like. As examples of the package, various materials such as polystyrene foam, Saran wrap (registered trademark), paper, plastics and the like may be given.

The RF tag 6 is affixed to the surface of the package of the commodity W. However, if the commodity W is not wrapped by the package, the RF tag 6 may be affixed to the surface of the commodity W.

Figure 3:
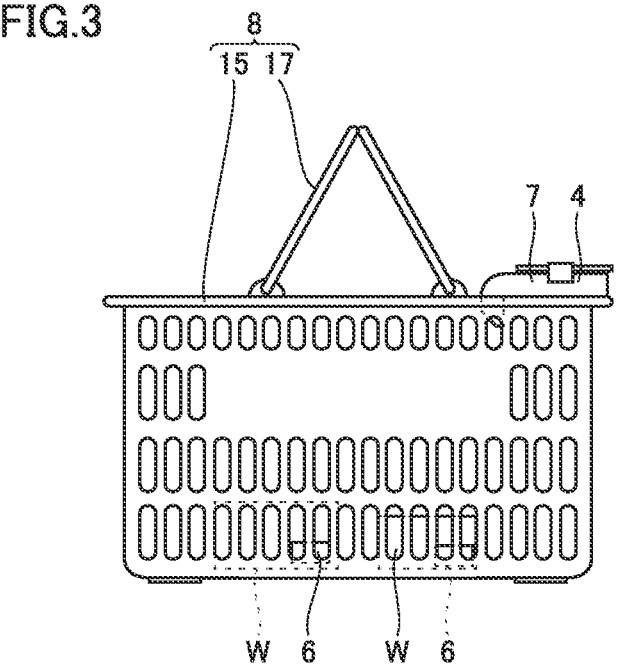
FIG. 3 is a schematic diagram schematically illustrating a shopping basket 8.

FIG. 3 is a schematic diagram schematically illustrating a shopping basket 8. The shopping basket 8 is arranged, for example, at the entrance of the store 10. The shopping basket 8 is used for accommodating any commodities W selected by the user 5.

The shopping basket 8 includes a basket body 15 and a handle 17. The basket body 15 is formed to have an opening upward. The handle 17 is attached to the basket body 15. The commodities W selected by the user 5 are housed in the shopping basket 8.

The RF tag reader 7 is disposed at an edge portion of the opening of the basket body 15. It should be noted that the RF tag reader 7 may be disposed at any position of the basket body 15.

The RF tag reader 7 is configured to be capable of communicating with the RF tag 6 affixed to each commodity W housed in the shopping basket 8 and the smart phone 4 of the user 5.

Figure 4:
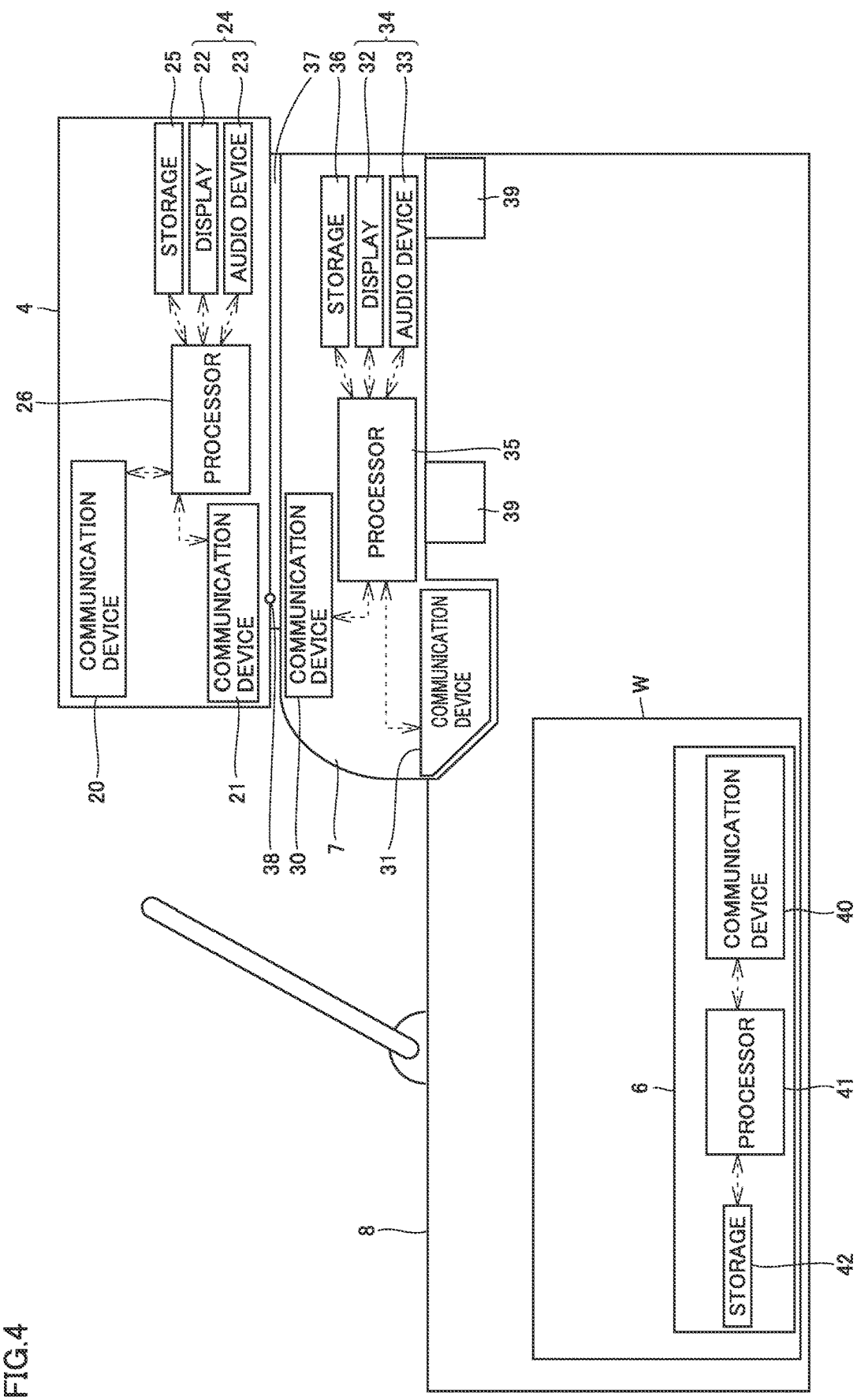
FIG. 4 is a block diagram illustrating a smart phone 4, an RF tag 6, and an RF tag reader 7.

FIG. 4 is a block diagram illustrating the smart phone 4, the RF tag 6 and the RF tag reader 7. The smart phone 4 includes a communication device 20, a short-range communication device 21, a notification device 24, a storage 25, and a processor 26.

The communication device 20 communicates with the electric vehicle 3. For example, the short-range communication device 21 may adopt Bluetooth (registered trademark) or the like to perform communication.

The notification device 24 includes a display 22 and an audio device 23. The display 22 may be a touch panel liquid crystal display or a touch panel organic EL display, for example. The storage 25 is configured to store various information. The processor 26 is configured to perform arithmetic processing based on various information input from the communication device 20, the short-range communication device 21 and the display 22 and various information stored in the storage 25. It should be noted that the arithmetic processing by the processor 26 may be executed by software or may be executed by hardware such as an electric circuit.

The RF tag reader 7 includes a communication device 30, a communication device 31, a notification device 34, a processor 35, a storage 36, a mounting table 37, a mounting switch 38, a fixing member 39, and a fixing band.

The communication device 30 is configured to communicate with the short-range communication device 21 of the smart phone 4. The communication device 30 may adopt Bluetooth (registered trademark) or the like to perform communication.

The notification device 34 includes a display 32 and an audio device 33. The display 32 may be, for example, a liquid crystal display screen or the like. The audio device 33 may be, for example, a speaker.

The processor 35 performs various arithmetic processing. The arithmetic processing performed by the processor 35 may be performed by software or by hardware such as an electric circuit. The storage 36 may be a nonvolatile memory.

The mounting table 37 is a table for mounting the smart phone 4. The mounting switch 38 is provided on the mounting surface of the mounting table 37, and is turned on when the smart phone 4 is mounted on the mounting table 37. The fixing member 39 is for fixing the RF tag reader 7 to the shopping basket 8. The fixing band is for fixing the smart phone 4 mounted on the mounting table 37.

The RF tag 6 includes a communication device 40, a processor 41, and a storage 42. The communication device 40 is configured to communicate with the communication device 31. The communication system between the communication device 31 and the communication device 40 may be an electromagnetic induction system, and the communication distance therebetween may be about 30 cm. Therefore, the RF tag reader 7 may communicate with the RF tag 6 of each commodity W housed in the shopping basket 8. On the other hand, the distance between the RF tag reader 7 and the RF tag 6 of each commodity W arranged on the display shelf of the store 10 is longer than the communication distance mentioned above.

Upon receiving a signal from the communication device 31, the communication device 40 sends the received signal to the processor 41, and uses the signal from the communication device 31 as the power to drive the processor 41.

The processor 41 performs arithmetic processing or the like based on the information received by the communication device 40 and the information stored in the storage 42. The arithmetic processing performed by the processor 41 may be performed by software or may be performed by hardware such as an electric circuit.

Figures 5, 6:
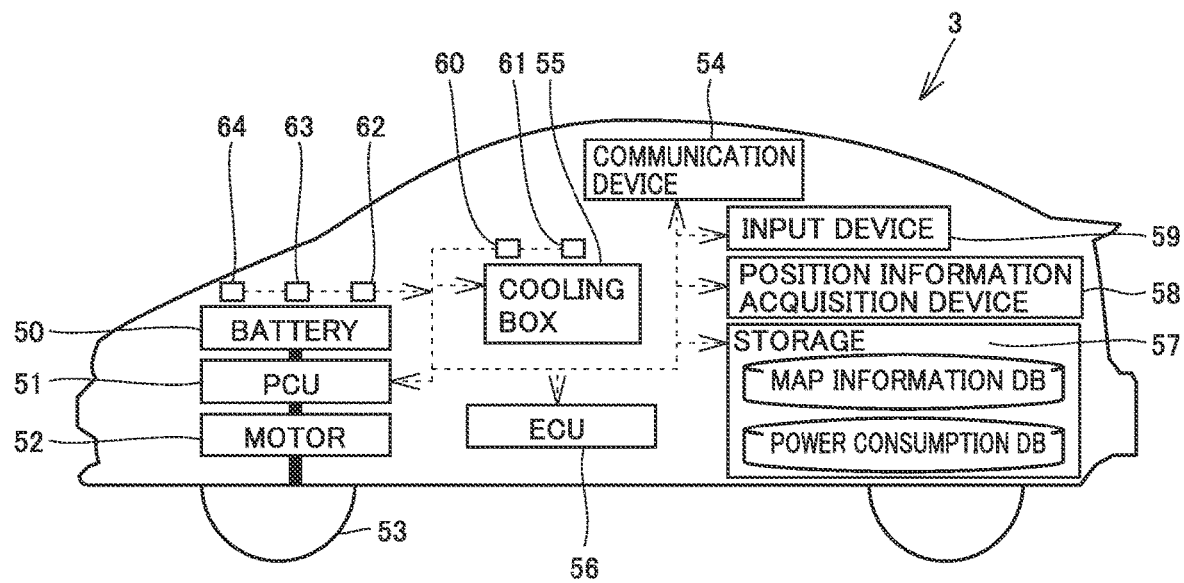
FIG. 5 is a diagram schematically illustrating information stored in a storage device 42.
FIG. 6 is a block diagram illustrating the configuration of an electric vehicle 3.

The storage 42 is a rewritable nonvolatile memory. FIG. 5 is a diagram schematically illustrating information stored in the storage 42. The storage 42 stores information such as commodity name, storage conditions, weight and the like of each commodity W to which the storage 42 is affixed. The storage conditions include storage type and storage temperature. Thus, the storage 42 stores storage information indicating the storage conditions of each commodity W.

FIG. 6 is a schematic diagram illustrating the configuration of the electric vehicle 3. The electric vehicle 3 includes a battery 50, a PCU (power control unit) 51, a motor 52, and an ECU (Electronic control unit) 56.

The battery 50 may be a lithium ion secondary battery, for example. The PCU 51 is configured to boost a DC power from the battery 50, convert the boosted DC power into an AC power, and supply the AC power to the motor 52. The motor 52 is driven by the electric power of the battery 50 supplied through the PCU 51 so as to rotate driving wheels 53. The electric vehicle 3 is made to travel by the driving force from the motor 52. The PCU 51 is controlled by an instruction from the ECU 56.

The electric vehicle 3 includes a communication device 54, a cooling box 55, a storage 57, a position information acquisition device 58, an input device 59, temperature sensors 60 and 61, a voltage sensor 62, a current sensor 63, and a temperature sensor 64.

The communication device 54 is configured to communicate with the communication device 20 of the smart phone 4.

Figure 7:
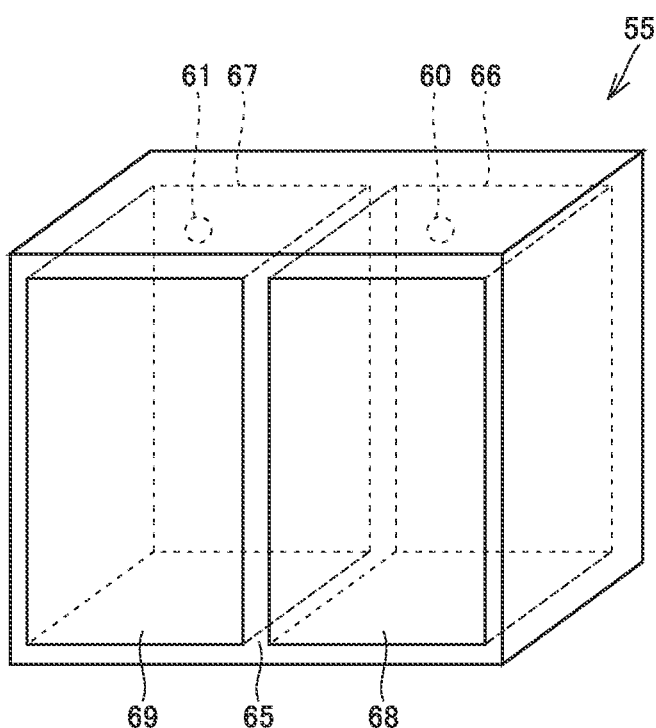
FIG. 7 is a schematic diagram schematically illustrating a cooling box 55.

FIG. 7 is a schematic diagram schematically illustrating the cooling box 55. The cooling box 55 includes a main body 65, and doors 68 and 69. A refrigerating compartment 66 and a freezing compartment 67 are formed in the main body 65. The door 68 is configured to open and close the refrigerating compartment 66, and the door 69 is configured to open and close the freezing compartment 67. Note that the cooling box is provided with at least one of a refrigerating function and a freezing function.

The electric vehicle 3 is provided with a cooling circuit (not shown) so that the refrigerating compartment 66 and the freezing compartment 67 each is supplied with cold air from the cooling circuit. A damper is provided in a supply pipe that supplies cold air to the refrigerating compartment 66, and similarly, a damper is provided in a supply pipe that supplies cold air to the freezing compartment 67. Thereby, the temperature in the refrigerating compartment 66 and the temperature in the freezing compartment 67 are adjusted by adjusting the amount of cold air supplied to the refrigerating compartment 66 and the amount of cold air supplied to the freezing compartment 67, respectively.

The temperature sensor 60 is provided in the refrigerating compartment 66, and the temperature sensor 61 is provided in the freezing compartment 67. The temperature sensor 60 and the temperature sensor 61 each is configured to send the measured temperature to the ECU 56.

As illustrated in FIG. 6, the voltage sensor 62 detects the voltage of the battery 50 and sends the detection result to the ECU 56. The current sensor 63 detects the amount of current flowing into the battery 50 and the amount of current flowing out of the battery 50, and sends the detection result to the ECU 56. The temperature sensor 64 detects the temperature of the battery 50 and sends the detection result to the ECU 56.

The ECU 56 calculates the remaining power (W) of the battery 50 based on the voltage detected by the voltage sensor 62, the current detected by the current sensor 63, and the battery temperature detected by the temperature sensor 64. Various known methods may be adopted to calculate the remaining power of the battery 50.

The storage 57 is a nonvolatile memory. The storage 57 stores, for example, a map information DB and a power consumption DB of the cooling box 55. The power consumption DB of the cooling box 55 is such a database that is used to calculate the power amount consumed by the cooling circuit when the cooling circuit is actuated so as to alter the temperature of each of the refrigerating compartment 66 and the freezing compartment 67 to a preset temperature and the time required to alter the temperature of each of the refrigerating compartment 66 and the freezing compartment 67 to the preset temperature.

The power consumption DB of the cooling box 55 includes a power consumption database of the refrigerating compartment 66 and a power consumption database of the freezing compartment 67. The format of the database may be any one of a map, a graph and a calculation formula.

It should be noted that the power consumption DB of the cooling box 55 is such a database that may be used to calculate the electric power (W/h) required to maintain the temperature of the refrigerating compartment 66 at a predetermined temperature and the electric power (W/h) required to maintain the temperature of the freezing compartment 67 at a predetermined temperature.

The position information acquisition device 58 obtains position information of the electric vehicle 3. As a way of obtaining the position information of the electric vehicle 3, the method of obtaining position information from WiFi (Registered Trademark), the method of obtaining position information by using GPS (Global Positioning System) or the like may be adopted. The position information acquisition device 58 sends the obtained position information to the ECU 56.

The input device 59 may be, for example, a navigation screen. The input device 59 may be, for example, a touch panel liquid crystal display screen or a touch panel organic EL display screen. The user 5 may use the input device 59 to input a next destination. The information input into the input device 59 is stored in the storage 57.

Figure 8:
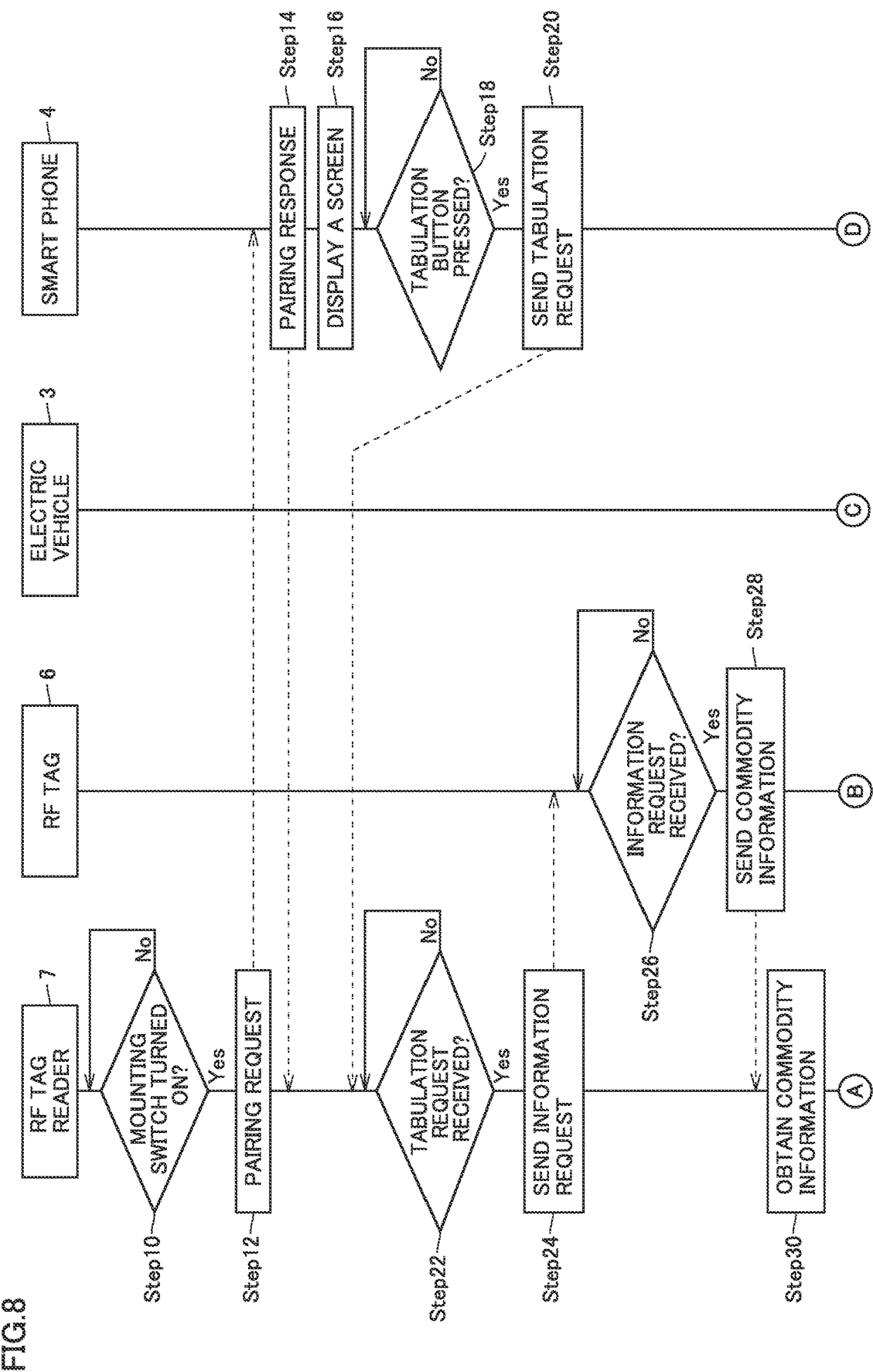
FIG. 8 is a state diagram of the notification system 1.

FIG. 8 is a state diagram of the notification system 1.

The operation of the notification system 1 will be described with reference to FIGS. 4 and 8. In the present embodiment, it is assumed that the user 5 parks the electric vehicle 3 in a parking lot of the store 2, enters the store 2 for purchasing the commodities W, and holds a shopping basket 8 in his/her hand.

The user 5 fixes the smart phone 4 to the RF tag reader 7 disposed in the shopping basket 8. Specifically, the user 5 fixes the smart phone 4 to the mounting table 37 of the RF tag reader 7 by using a fixing band. When the smart phone 4 is fixed to the mounting table 37, the mounting switch 38 is turned on.

As illustrated in FIG. 8, the processor 35 of the RF tag reader 7 determines whether or not the mounting switch 38 is turned on (step 10). When it is determined that the mounting switch 38 is turned on (Yes at step 10), the communication device 30 sends a pairing request to the surroundings (step 12). The communication distance of the communication device 30 is about 30 cm or less.

The smart phone 4 is mounted on the mounting table 37, and the short-range communication device 21 of the smart phone 4 receives the pairing request. Upon receiving the pairing request, the processor 26 of the smart phone 4 sends a pairing response to the RF tag reader 7 through the short-range communication device 21 (step 14). Thereby, the smart phone 4 and the RF tag reader 7 are ready to exchange information.

Figures 9, 10:
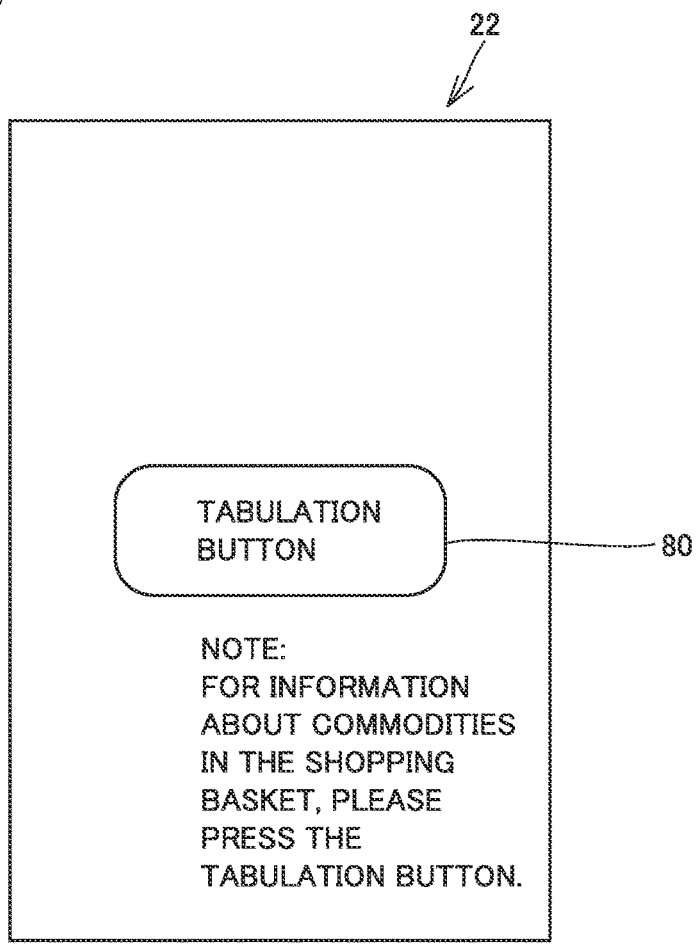
FIG. 9 is a schematic diagram schematically illustrating a screen displayed on a display 22 after communication is established between the smart phone 4 and the RF tag reader 7.
FIG. 10 is a schematic diagram schematically illustrating commodity information which is obtained from each RF tag 6 and temporarily stored in a storage device 36 of the RF tag reader 7.

When the communication is established between the RF tag reader 7 and the smart phone 4 as described above, the processor 26 of the smart phone 4 displays a screen as illustrated in FIG. 9 on the display 22 (step 16).

FIG. 9 is a schematic diagram schematically illustrating a screen displayed on the display 22 after the communication is established between the smart phone 4 and the RF tag reader 7. The screen displayed on the display 22 includes a tabulation button 80.

For example, after the user 5 selects the commodities W from the display shelf and puts them in the shopping basket 8, he/she may press the tabulation button 80 on the screen of the display 22.

The processor 26 of the smart phone 4 determines whether or not the tabulation button 80 has been pressed (step 18). When it is determined that the tabulation button 80 has been pressed, the processor 26 of the smart phone 4 sends a tabulation request to the RF tag reader 7 through the short-range communication device 21 (step 20).

After receiving the pairing response from the smart phone 4 (step 14), the processor 35 of the RF tag reader 7 determines whether or not the tabulation request has been received (step 22).

When the processor 35 of the RF tag reader 7 determines that the tabulation request has been received (Yes at step 22), the processor 35 sends an information request through the communication device 31 (step 24).

The communication device 31 sends the information request to the shopping basket 8. When a commodity W is housed in the shopping basket 8, the RF tag 6 of the commodity W receives the information request. After receiving the information request, the RF tag 6 activates the processor 41 or the like by the power of the signal. When it is determined that the information request has been received (Yes at step 26), the processor 41 of the RF tag 6 sends the commodity information including the storage information to the RF tag reader 7 through the communication device 40 (step 28). Specifically, the information illustrated in FIG. 5 is sent to the RF tag reader 7.

When a plurality of commodities W are housed in the shopping basket 8, and thereby a plurality of RF tags 6 are housed in the shopping basket 8, the commodity information illustrated in FIG. 5 is sent to the RF tag reader 7 from each RF tag 6.

Then, the communication device 31 of the RF tag reader 7 obtains the commodity information including the storage information from each of the plurality of RF tags 6 (step 30). FIG. 10 is a schematic diagram schematically illustrating the commodity information which is obtained from each RF tag 6 and temporarily stored in the storage 36 of the RF tag reader 7. As illustrated in FIG. 10, the RF tag reader 7 obtains a plural pieces of commodity information. The commodity information includes storage information, commodity name, and information on the weight of each commodity. It should be noted that the storage information includes information indicating storage conditions such as the storage type and the storage temperature.

Figure 11:
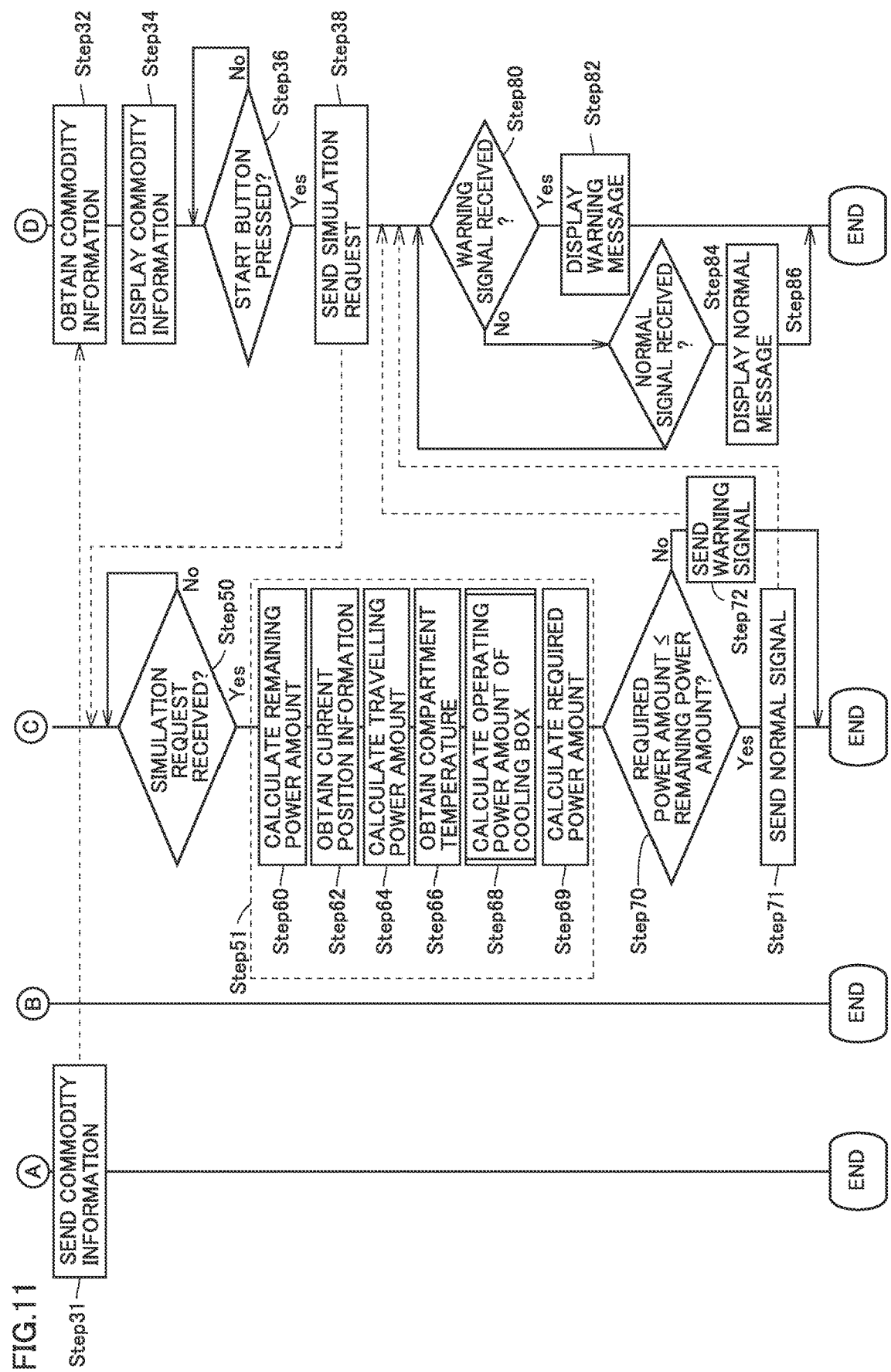
FIG. 11 is a state diagram of the notification system 1 after step 32.

FIG. 11 is a state diagram of the notification system 1 after step 30. The processor 35 of the RF tag reader 7 sends the commodity information illustrated in FIG. 10 to the smart phone 4 through the communication device 30 (step 31).

The smart phone 4 obtains the information including the storage information of each commodity W housed in the shopping basket 8 from the RF tag reader 7 (step 32).

Figure 12:
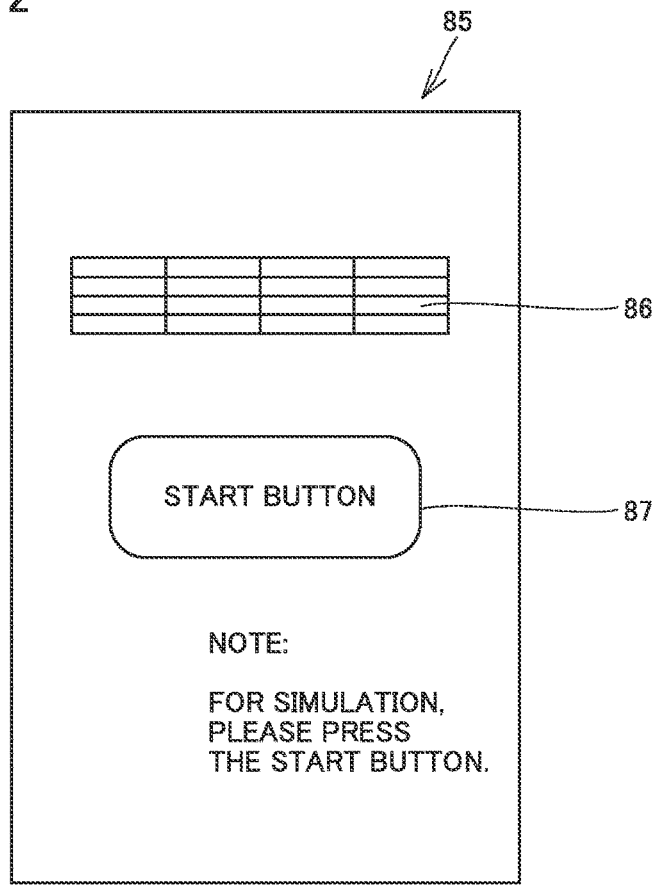
FIG. 12 is a schematic diagram illustrating a screen displayed on the display 22 in step 34.

After receiving the commodity information (storage information) of each commodity W housed in the shopping basket 8, the processor 26 of the smart phone 4 displays the commodity information of each commodity W on the display 22 (step 34). FIG. 12 is a schematic diagram illustrating a screen displayed on the display 22 at step 34. A screen 85 is displayed on the display 22. The screen 85 includes a list 86 and a start button 87.

The commodity information of the commodities W housed in the shopping basket 8 is listed in the list 86. Specifically, the information such as the commodity name and the storage conditions of each commodity W is listed.

The start button 87 is configured to cause the electric vehicle 3 to calculate whether or not the electric vehicle 3 can travel to a next destination while the commodities W shown in the list 86 are being preserved under the storage conditions shown in the list 86. It should be noted that a form for inputting a subsequent destination may be provided in the screen 85.

After the screen 85 is displayed, the processor 26 of the smart phone 4 determines whether or not the start button 87 has been pressed (step 36). When it is determined that the start button 87 has been pressed (Yes at step 36), the processor 26 sends a simulation request to the electric vehicle 3 through the communication device 20 (step 38). For example, the simulation request is sent from the communication device 20 to the electric vehicle 3 via the Internet.

As illustrated in FIG. 10, the simulation request includes information such as the commodity name and the storage conditions. In case that a form for inputting a destination is provided on the screen 85 and a destination is input by the user 5, the information indicating the destination is included in the simulation request.

The ECU 56 of the electric vehicle 3 determines whether or not the simulation request has been received (step 50). When it is determined that the simulation request has been received, the ECU 56 starts a travel simulation process (step 51).

In the travel simulation process, firstly, the ECU 56 calculates the remaining power amount of the battery 50 (step 60). It should be noted that SOC (State of charge) may be calculated instead of the remaining power amount of the battery 50. The remaining power amount or the like may be calculated according to a well-known calculation method based on the detection results from the voltage sensor 62, the current sensor 63, the temperature sensor 64 and the like.

Next, the ECU 56 obtains the current position information (step 62). Specifically, the ECU 56 obtains the position information of the current position from the position information acquisition device 58.

Subsequently, the ECU 56 calculates the travelling power amount (step 64). Specifically, the power amount required by the electric vehicle 3 to travel from the current position to the destination is calculated.

When the information indicating a destination is included in the simulation request, the ECU 56 calculates the power amount required to travel to the destination included in the simulation request.

When the simulation request does not include the information indicating a destination, the ECU 56 calculates the power amount required to travel to the destination input into the input device 59 of the electric vehicle 3.

Further, neither a destination is input into the input device 59 nor information indicating the destination is included in the simulation request, the ECU 56 calculates the power amount required to travel a specific distance (for example, 20 km).

In the present specification, the predetermined distance includes both the distance from the current position to the destination and the specific distance.

The power amount required by the electric vehicle 3 to travel the predetermined distance is calculated on the basis of the map information DB stored in the storage 57, the current position information, the destination and the like. For example, the power amount may be calculated on the basis of the route from the current position to the destination, the altitude difference, the predicted average vehicle speed, the travelling time and the like. As a specific calculation method, various conventional methods may be adopted.

Next, the ECU 56 obtains the compartment temperature of the refrigerating compartment 66 and the compartment temperature of the freezing compartment 67 of the cooling box 55 (step 66). Specifically, the compartment temperature is obtained from each of the temperature sensors 60 and 61.

Figure 13:
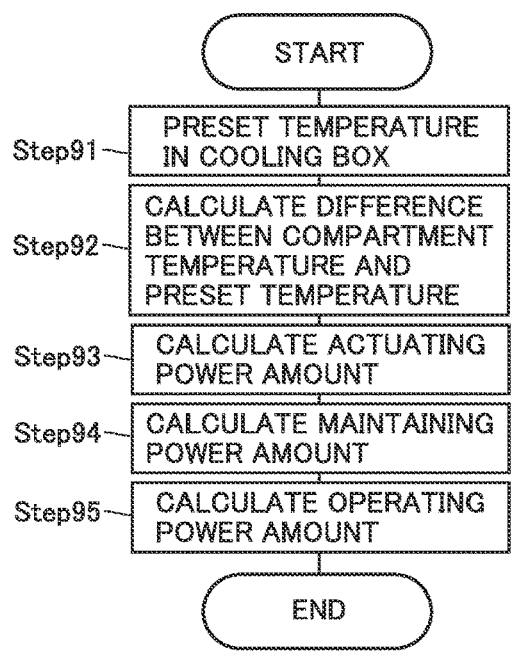
FIG. 13 is a flowchart illustrating a method of calculating the operating power amount of the cooling box 55.

The ECU 56 calculates the operating power amount of the cooling box 55 (step 68). FIG. 13 is a flowchart illustrating a method of calculating the operating power amount of the cooling box 55.

The ECU 56 sets the cooling box to a preset temperature (step 91). Specifically, the preset temperature is set based on the storage information received from the RF tag reader 7. The storage information includes the storage type for each commodity W. Therefore, the ECU 56 extracts the lowest storage temperature for a commodity whose storage type is "refrigerated", and sets this storage temperature as the preset temperature for the refrigerator compartment 66. Further, the ECU 56 extracts the lowest storage temperature for a commodity whose storage type is "frozen", and sets this storage temperature as the preset temperature for the freezing compartment 67.

The ECU 56 calculates a temperature difference between the current compartment temperature and the preset temperature (step 92). Specifically, the ECU 56 calculates the difference between the current compartment temperature and the preset temperature for the refrigerating compartment 66 and the difference between the current compartment temperature and the preset temperature for the freezing compartment 67.

The ECU 56 calculates an actuating power amount (step 93). Specifically, the ECU 56 calculates the sum of the power amount required to bring the compartment temperature of the refrigerating compartment 66 to its preset temperature and the power amount required to bring the compartment temperature of the freezing compartment 67 to its preset temperature, as the actuating power amount. In the present specification, the ECU 56 calculates the actuating power amount by using a power consumption DB of the cooling box 55 which is stored in the storage 57.

Next, the ECU 56 calculates a maintaining power amount of the cooling box 55 (step 94). Specifically, the ECU 56 calculates the sum of the maintaining power amount required to travel to the destination while maintaining the compartment temperature of the refrigerator compartment 66 at its preset temperature and the maintaining power amount required to travel to the destination while maintaining the compartment temperature of the freezing compartment 67 at its preset temperature, as the maintaining power amount of the cooling box 55.

The time required for bringing the compartment temperature of the refrigerating compartment 66 to its preset temperature and the time required for bringing the compartment temperature of the freezing compartment 67 to its preset temperature are mostly different from each other. As a result, the time required to maintain the temperature of the refrigerating compartment 66 and the time required to maintain the temperature of the freezing compartment 67 until arriving at the destination are different from each other. Therefore, the ECU 56 calculates the maintaining power amount of the refrigerating compartment 66 and the maintaining power amount of the freezing room 67 separately.

The ECU 56 calculates the maintaining power amount of the refrigerating compartment 66 and the maintaining power amount of the freezing compartment 67 by using the power consumption DB of the cooling box 55 which is stored in the storage 57.

Next, the ECU 56 calculates the operating power amount of the cooling box 55 (step 95). Specifically, the ECU 56 calculates the sum of the actuating power amount of the cooling box 55 and the maintaining power amount of the cooling box 55 as the operating power amount of the cooling box 55.

Next, returning to FIG. 11, the ECU 56 calculates a required power amount (step 69). Specifically, the ECU 56 calculates the sum of the operating power amount and the travelling power amount of the cooling box 55, as the required power amount.

The ECU 56 determines whether the required power amount is equal to or less than the remaining power amount of the battery 50 (step 70). If the required power amount is equal to or less than the remaining power amount of the battery 50 (Yes at step 70), the ECU 56 sends a normal signal to the smart phone 4 through the communication device 54 (step 71).

On the other hand, if the required power amount is larger than the remaining power amount of the battery 50 (No at step 70), the ECU 56 sends a warning signal (step 72).

After sending the simulation request at step 38, the smart phone 4 determines whether or not a warning signal is received (step 80). If it is determined that the warning signal is received (Yes at step 80), the processor 26 of the smart phone 4 notifies the user 5 of a warning by using the notification device 24 (step 82). Specifically, the warning is displayed on the display 22. The warning includes a message indicating that the selected commodity W cannot be transported to the next destination while being preserved under the storage conditions. Alternatively, the speaker 23 may be actuated to issue a warning sound.

If the destination is not set, the warning may include, for example, a message indicating that it is impossible for the vehicle to travel the specific distance (for example, 20 Km) while preserving the selected commodity W under the storage conditions.

On the other hand, upon receiving a normal signal, the processor 26 of the smart phone 4 displays a normal message on the display 22 (step 86). The normal message includes a message indicating that the selected commodity W can be transported to the next destination while being preserved under the storage conditions. If the destination is not set, the normal message includes a message indicating that it is possible for the vehicle to travel a specific distance (for example, 20 km).

As described above, according to the notification system 1 of the present embodiment, before the user 5 purchases a commodity W, the user 5 may know whether or not it is possible to transport the purchased commodity W over a predetermined distance while preserving the purchased commodity W under the storage conditions.

The embodiments disclosed herein are illustrative and non-restrictive in any respect. The technical scope indicated by the claims is intended to include any modifications within the scope and meaning equivalent to the terms of the claims.

What is claimed is:

1. A notification system comprising:
   an electric vehicle provided with a cooling box, a battery, and wheels driven by electric power from the battery;
   a tag reader configured to obtain storage information indicating storage conditions for a commodity selected by a user;
   a processor configured to send a warning signal when a travelling distance which can be covered by the electric vehicle with the selected commodity being preserved in the cooling box under the storage conditions indicated by the storage information is shorter than a predetermined distance; and
   a notification device including a display and an audio device and configured to notify the user of a warning upon receiving the warning signal.

2. The notification system according to claim 1, further comprising:
   a tag attached to a commodity,
   wherein
   the tag includes a tag memory configured to store the storage information of the commodity to which the tag is attached, and
   the tag reader is configured to communicate with the tag and obtain the storage information of the selected commodity from the tag.

3. The notification system according to claim 2, further comprising a mobile terminal provided with the notification device and carried by the user, wherein
   the processor is mounted on the electric vehicle, the mobile terminal is configured to communicate with the tag reader and the electric vehicle,
   the tag reader is configured to send the storage information of the selected commodity to the mobile terminal, and
   the mobile terminal is configured to send the storage information of the selected commodity received from the tag reader to the electric vehicle.

4. The notification system according to claim 1, further comprising:
   an input device being another display and configured to input a destination,
   wherein
   the processor obtains a current position of the electric vehicle; and
   the predetermined distance is a distance between the destination input into the input device and the current position obtained by the position information acquisition device.

5. An information processing device comprising:
   a tag reader configured to obtain storage information of a commodity selected by a user; and
   a processor configured to send a warning signal when a travelling distance which can be covered by an electric vehicle with the selected commodity being preserved in a cooling box, which is mounted on the electric vehicle, under storage conditions indicated by the storage information is shorter than a predetermined distance.

* * * * *